Figure 1:
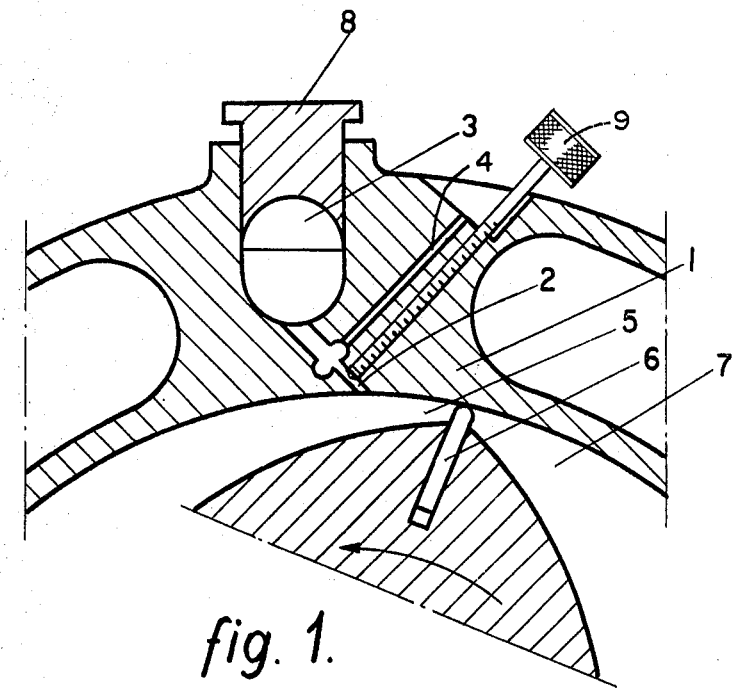

United States Patent

[11] 3,587,533

| [72] | Inventor | Stanislaw Jarnuskiewicz |
| | | ul. Swierczewskiego 29 m 8, Krakow, Poland |
| [21] | Appl. No. | 816,425 |
| [22] | Filed | Nov. 6, 1968 |
| [45] | Patented | June 28, 1971 |

[54] ACCUMULATOR CHAMBER FOR SUPPLYING FUEL TO A ROTARY PISTON ENGINE
2 Claims, 2 Drawing Figs.

[52] U.S. Cl. .................................................. 123/8.09, 418/61, 123/33
[51] Int. Cl. .................................................. F02b 53/10
[50] Field of Search .......................................... 123/8, 8 (JJ), 8 (GOK), 8 (RV), 8.09, 16, 33 (C); 418/61 (NS)

[56] References Cited
UNITED STATES PATENTS

| 1,437,396 | 12/1922 | Brush | 123/33(C) |
| 2,783,747 | 3/1957 | Layne | 123/33(C)(UX) |
| 3,121,421 | 2/1964 | Peterson | 123/8(JJ)(UX) |
| 3,227,145 | 1/1966 | Bernard | 123/8(JJ)(UX) |
| 3,253,580 | 5/1966 | Eberhard et al. | 123/8(JJ) |

*Primary Examiner*—Allan D. Herrmann
*Attorney*—Stevens, Davis, Miller and Mosher

ABSTRACT: A rotary piston internal combustion engine with improved fuel injection which is accomplished by having an accumulating chamber in the housing to receive some of the high pressure gases of the working chamber and pass these gases to the next successive, and lower pressure chamber, to effect fuel injection.

PATENTED JUN 28 1971   3,587,533

INVENTOR.
STANISLAW JARNUSZKIEWICZ
BY
Stevens, Davis, Miller & Mosher
ATTORNEYS

ACCUMULATOR CHAMBER FOR SUPPLYING FUEL TO A ROTARY PISTON ENGINE

DISCLOSURE

The present invention relates to rotary piston, spark ignition, internal combustion engines in which engines the working chambers are separated by front seal strips on the piston and the combustion chambers are situated in the rotary piston. In these engines, as in four-stroke piston engines, the supply of light fuel is injected at the beginning of the compression stroke which is very advantageous because it results in decreasing the amount of fuel consumption per unit and reduction of the toxic properties of combustion gases, as well as in increasing the power of the engine.

The object of this invention is to provide the engine construction with a simple injection system, which is reliable in operation, economical to manufacture and in which the effect of pneumatic injection is utilized, resulting in the best fuel spraying.

The important feature of the invention is the utilization of an instantaneous pressure difference between adjacent working chambers of the engine in order to accumulate a certain small amount of hot combustion gases taken, after the ignition, from the high pressure working chamber into a separate accumulating chamber, connected by a duct to the working space of the engine, which duct port is controlled by front seal strips on the rotary piston. When the front seal strip of the piston moves across the duct port, the accumulating chamber is connected to another working chamber of the engine which, at the beginning of the compression stroke, has low pressure. The high pressure gases, exhausted from the accumulating chamber, entrain and spray fuel supplied to the accumulating chamber, or to the duct, in a definite amount and propel it to the working chamber of the engine.

The application of the present solution results in the best spraying of fuel and insures proper conditions for air mixture forming and, furthermore, provides possibilities for fuel heavier than petrol to drive spark ignition engines by utilizing the spraying of hot gases which facilitates the spraying and deaeration of fuel. In this case the possibility of enlarging the accumulating chamber capacity is provided in order to supply a greater amount of hot combustion gases for spraying of fuel.

At present there are in use rotary piston engines equipped with carburetor supply systems and conventional injection systems. There is also known, from the German Democratic Republic Pat. No. 47,468, Cl. 46a⁵. 10, a rotary piston engine equipped with injection means made as ducts for connecting working spaces of the engine when the front seal strip is moving between the extreme edges of the inlet and outlet ports of these ducts. Carburetor systems have, in comparison to fuel injection and piston engine systems, a number of drawbacks, the most important of which are the increased unit consumption of fuel, low power and a higher percentage of carbon oxide in the combustion gases. On the other hand, the injection systems as used heretofore have been intricate and expensive, so that conditions of their operation in rotary piston engines create additional problems due to both increased injection frequency, as well as the form of the combustion chambers. The disadvantage of the injection system in the rotary piston engine according to the above-mentioned German Democratic Republic Pat. No. 47,468, consists in that the volume of gas injected depends on the time of injection duration and thus is also dependent on the number of revolutions so that the injection time is longer at low speed, and becomes shorter as the speed grows higher.

Since the range of speed in rotary piston engines is large, the characteristic of fuel spray changes with the higher numbers of revolutions, while with the lower numbers of revolutions there occur considerable pressure losses, which fact is of great importance for the engine efficiency. The rotary piston engine disclosed under the present invention and incorporating injection means which means represent advantageous features of both systems, such as simplicity and low costs of manufacture, most accurate fuel spraying and low consumption amount, the possibility of the delamination of charge and reduced toxity of combustion gases, is substantially free of the above-mentioned defects. The injection means according to this invention, when incorporated in the engine, render the characteristics of the injection independent of the variable number of engine revolutions since the injection is always effected with the same amount of gas, in relation to the amount of the injected fuel.

Figure 2:
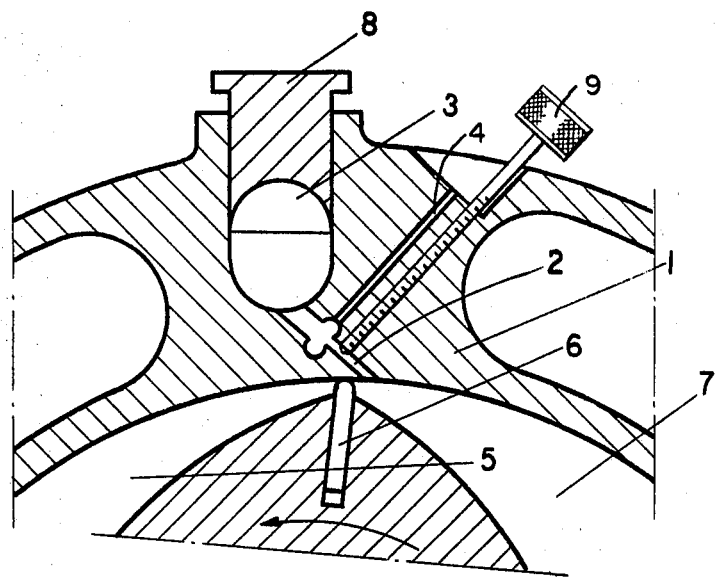

An embodiment of the present invention will now be described, by way of example, with reference to the attached drawings in which:

FIG. 1 shows a sectional fragment of the rotary piston engine with the accumulating chamber formed in the housing and shown when charged; and FIG. 2 shows the fragment of FIG. 1 at the moment of injection.

The engine embodiment, as shown in FIG. 1, comprises an injection duct 2 formed in the engine housing 21 and having an axially constant cross section, which, however, can be made controllable by common means here noted by block 9. The duct 2 communicates on one side with the working space of the engine and on the other with the accumulating chamber 3 which can have either a constant capacity or can be made adjustable by moving the plug or piston 8 accordingly. This plug or piston 8 can be either threaded or force-fitted into the housing 1. Either the injection duct 2 or the accumulating chamber 3 receives fuel, supplied in controlled quantities via duct 4. When the port of the duct 2 arrives within the reach of the working chamber 5 of the engine, having a higher pressure and being separated by the seal strip 6 from the lower pressure chamber 7, the accumulating chamber 3 is charged with gases at the same pressure as chamber 5, entraining with said gases a portion of fuel supplied from duct 4. Once the seal strip 6 passes the duct 2 port, the excess of gas and fuel will flow from the accumulating chamber 3 to the working lower pressure chamber 7, thus accomplishing the process of fuel injection.

The principle of the operation of the engine, according to this invention, consists in the fact that a certain amount of gas from the higher pressure chamber becomes accumulated in the accumulating chamber 3 to perform injection into the working where momentarily a lower pressure prevails, due to the duct 2 being uncovered by strip 6 separating both chambers. The gas when inflowing into the accumulating chamber, or outflowing therefrom, entrains and sprays a portion of the fuel furnished from the supply system. No combustion takes place in the accumulating chamber 3. The outlet port of the duct 2 can be located on the front or side face of the housing and, depending on its distance from spark plug location, the injected medium may be combustion gases or the compressed mixture. The accumulating chamber may be of a constant volume, but if necessary, there exists the possibility of controlling it by displacing its upper part upwards or downwards, depending on the applied fuel, in order to obtain the right spraying of it.

I claim:

1. In a rotary piston internal combustion engine, the improvement comprising an accumulating chamber formed in the housing of said engine, injection duct means connecting said accumulating chamber to a working chamber of said engine, whereby high pressure gases and fuel in said working chamber are introduced into said accumulating chamber and, after the front seal strip of the piston has passed the injection duct, said gases are exhausted into the successive working chamber, which is at low pressure, entraining therewith from a fuel supply duct additional fuel for combustion.

2. A rotary piston internal combustion engine according to claim 1 further comprising means for adjusting the volume of said accumulating chamber and means for adjusting the cross section of said injection duct.